Figure 1:
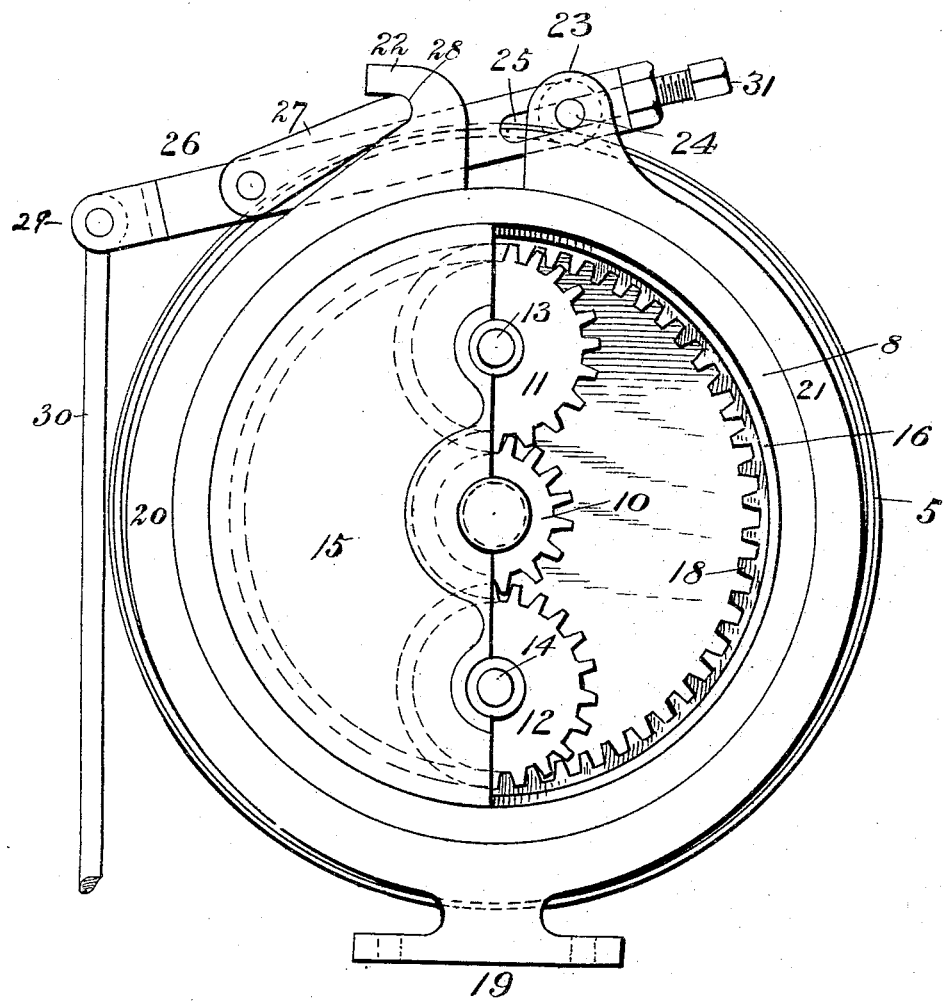

No. 765,848. PATENTED JULY 26, 1904.
H. W. LOUDEN, Sr.
GEARING.
APPLICATION FILED JAN. 16, 1904.
NO MODEL. 2 SHEETS—SHEET 1.

Witnesses
F. L. Orrand.
W. Parker Reinohl.

Inventor
H. W. Louden Sr.
By D. C. Reinohl
Attorney

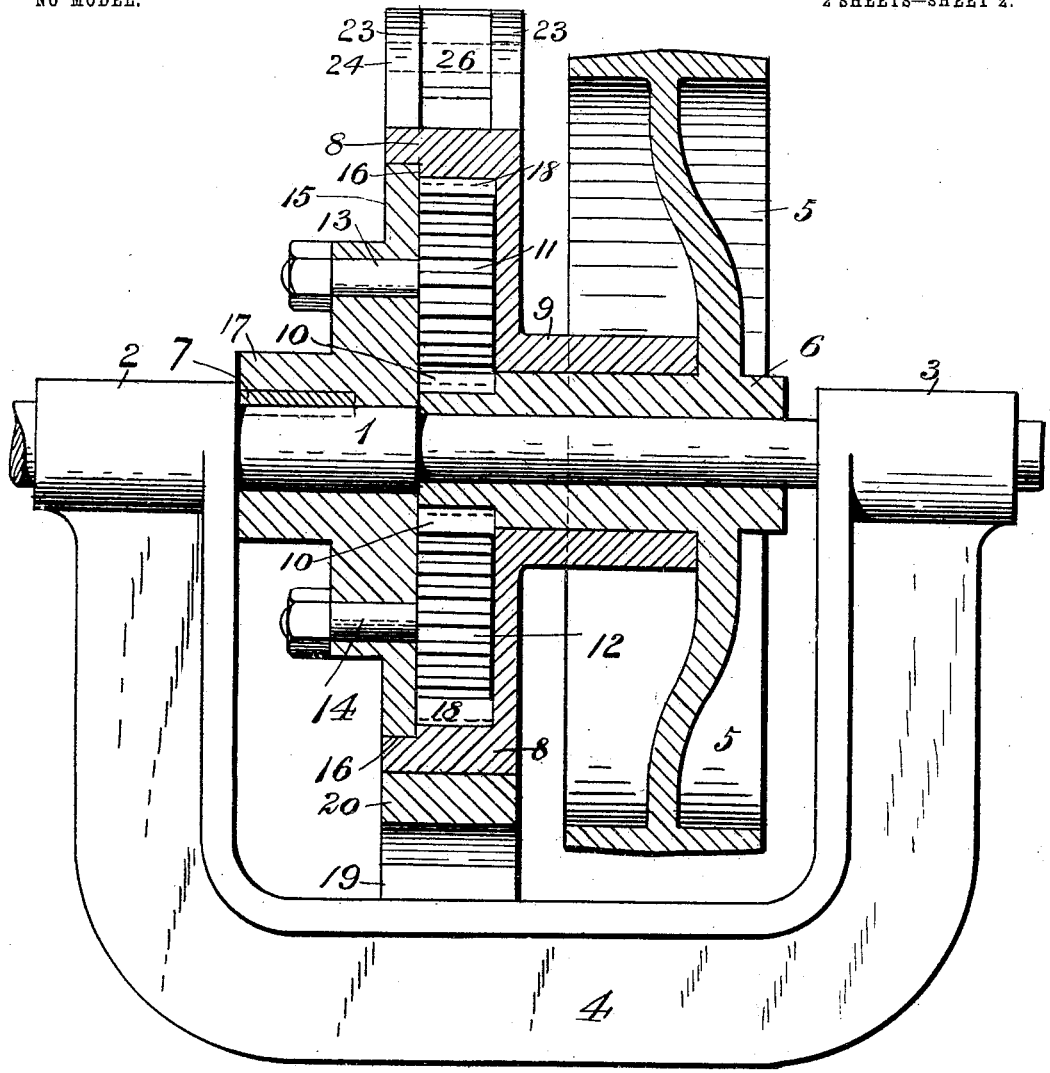

No. 765,848. Patented July 26, 1904.

UNITED STATES PATENT OFFICE.

HENRY W. LOUDEN, SR., OF LEBANON, PENNSYLVANIA.

GEARING.

SPECIFICATION forming part of Letters Patent No. 765,848, dated July 26, 1904.

Application filed January 16, 1904. Serial No. 189,295. (No model.)

*To all whom it may concern:*

Be it known that I, HENRY W. LOUDEN, Sr., a citizen of the United States, residing at Lebanon, in the county of Lebanon and State of Pennsylvania, have invented certain new and useful Improvements in Gearing; and I do hereby declare the following to be a full, clear, and exact description of the invention, such as will enable others skilled in the art to which it appertains to make and use the same.

My invention relates to gearing for transmitting power and has especial reference to that class of gearing known as "planetary;" and the invention consists in certain improvements in construction which will be fully disclosed in the following specification and claims.

In the accompanying drawings, which form part of this specification, Figure 1 represents an end elevation, partly in section, of my improved gearing; and Fig. 2, a vertical section, partly in side elevation.

Reference being had to the drawings and the designating characters thereon, 1 indicates a shaft supported at both its ends in suitable bearings 2 3 on a bracket or stand 4, and loosely mounted on the shaft is a pulley 5, having an elongated hub 6.

8 is an internally-geared wheel having an elongated hub 9, which surrounds the hub 6 of the driving-pulley and is supported thereon, and on the inner end of hub 6 is secured a pinion 10, which engages pinions 11 and 12, revolubly supported on studs 13 14, extending through the disk 15, which is seated in an annular rabbet 16 in the rim of the gear-wheel 8 and is provided with a hub 17, secured to the shaft by a spline 7. The disk 15 completely covers the gearing within the wheel 8 and prevents accidental engagement therewith. The pinions 11 and 12 engage the teeth 18 on the inside of the wheel 8 and transmit the power from the pulley to said wheel.

It is obvious that the diameter of the several pinions and the gear-wheel may be varied to suit requirements of power and speed without departing from the spirit of my invention.

Surrounding the gear-wheel 18, concentric thereto and in frictional contact with whose periphery is a friction-clutch having a base 19, which in the present instance rests upon and is secured to the bracket 4 and is provided with contractible and upwardly-tapering arms 20 21, which in their normal position admit of a free revolution of the gear-wheel 8 and which are possessed of sufficient resiliency to return to their normal position after they are released from frictional engagement with the wheel.

The arm 20 is provided with two lugs 22, only one of which is shown, and the arm 21 with two lugs 23, through which lugs extends a transverse pin 24, which engages a slot 25 in an elongated and slotted yoke 26, which carries two pawls 27, only one of which is shown, which engage seats 28 in the lugs 22, and to the end 29 of the yoke is attached a rod 30, by which the arms 20 and 21 are forcibly drawn toward each other at their free ends to clamp the periphery of the gear-wheel 8.

On one end of the yoke 26 is a set-screw 31, which engages the transverse pin 24 to regulate the leverage of the yoke in its action on the arms 20 and 21.

Having thus fully described my invention, what I claim is—

1. A revoluble and internally-toothed gear-wheel, and a brake engaging said wheel; in combination with a power-shaft, a pulley on said shaft, a pinion operated by said pulley, a pinion interposed between said gear-wheel and said pinion, and a disk seated in the rim of the gear-wheel, supporting the interposed pinion, and secured to the power-shaft.

2. A revoluble and internally-toothed gear-wheel, and a contractible brake surrounding and engaging the periphery of said wheel; in combination with a power-shaft, a pulley on said shaft, a pinion operated by said pulley, a pinion interposed between said gear-wheel and said pinion, and a disk engaging an annular rabbet in the rim of the gear-wheel, supporting the interposed pinion and secured to the power-shaft.

3. A revoluble and internally-toothed gear-wheel, and a brake engaging said wheel; in combination with a power-shaft, a pulley on said shaft, a pinion supported by the hub of said pulley, a pair of pinions on opposite sides of the first pinion and interposed between it and the gear-wheel, and a disk closing one end of the gear-wheel, supporting the interposed pinions and covering all of the gearing.

4. A revoluble and internally-toothed gear-wheel, and a brake engaging the periphery of said wheel; in combination with a shaft, a pulley on said shaft, a pinion on the hub of said pulley, a pair of pinions on opposite sides of the first pinion and interposed between it and the gear-wheel, and a disk engaging an annular rabbet in the rim of the gear-wheel, supporting the interposed pinions and secured to the shaft.

5. A revoluble and internally-toothed gear-wheel, a driving-pinion, and pinions intermediate said gear-wheel and said driving-pinion, a disk supporting the latter pinions and covering all the gearing and a power-shaft connected to said gearing; in combination with a brake engaging said gear-wheel.

In testimony whereof I affix my signature in presence of two witnesses.

HENRY W. LOUDEN, Sr.

Witnesses:
 Thomas Failer,
 James G. Moore.